: 3,108,007
Patented Oct. 22, 1963

3,108,007
PROCESS OF MAKING REFRACTORY BRICK
CONTAINING CALCINED MAGNESIA
Russell Pearce Heuer, Villanova, Pa., assignor to General Refractories Company, a corporation of Pennsylvania
No Drawing. Filed Nov. 3, 1960, Ser. No. 66,903
3 Claims. (Cl. 106—59)

The present invention relates to refractory brick made from calcined magnesia.

The subject matter formerly in this application relating to reaction of two kinds of magnesia is now embodied in continuation-in-part application, Serial No. 220,133, filed August 29, 1962, for Process of Making Refractory Brick Containing Calcined Magnesia.

Calcined magnesia may be mixed with chrome ore, or the calcined magnesia may be incorporated with other additions such as alumina, chromic oxide or other substances which are designed to be incorporated with the magnesia.

A purpose of the invention is to increase the strength at intermediate temperature above 1000° C. and at high temperature above 1600° C. of brick in which magnesia is a substantial component.

A further purpose is to eliminate the tendency of brick based on or containing substantial amounts of magnesia to lack volume stability and to lack ability to support static load at high temperature.

A further purpose is to mix together a magnesia containing more than 2 percent by weight of ferric oxide, and having lime and silica as impurities in a ratio by weight of more than two, and having dicalcium ferrite present as a substantial mineralogical component, and Transvaal type chrome ore having silica as an impurity in a quantity between 1 and 4 percent by weight, the quantity of chrome ore being from 10 to 35 percent of the total weight of the refractory mixture, and the ratio of lime to silica in the mixture exceeding 1.0 and preferably being about 1.5, and to heat the mixture suitably after molding to a temperature between 1000° and 1700° C. so as to increase the strength at intermediate temperature and high temperature.

Further purposes appear in the specification and in the claims.

Calcined magnesia (often called dead-burned magnesite) is widely employed as a refractory product, both to make up substantially all of a brick composition in the case of magnesia brick, and also as the magnesia component of other brick. The calcined magnesia may be used as a component in a mixture with chrome ore. Magnesia is also used in refractory brick along with additions of alumina, of chromic oxide or other substances.

The present invention relates to the improvement of the refractory properties and particularly the strength of brick at high temperature, where the magnesia is used as the magnesia component of a brick as above referred to.

Refractory products made of calcined magnesia, with or without additions of chrome, alumina or chromic oxide, are now frequently produced from calcined magnesia manufactured from sea water or from brine, or made by calcining natural magnesite such as the magnesite occurring in Greece or India.

The present invention is concerned with a type of calcined magnesia which, for the purpose of the present discussion, is being designated as type II, made by calcining beneficiated magnesite prepared from deposits in Austria.

This type II calcined magnesia is characterized by containing from 2 percent to 10 percent by weight, and usually 5 percent or more of ferric oxide. The ratio of lime to silica as an impurity by weight exceeds 2. The silica content is typically in the range between 0.25 and 1 percent by weight and the lime is typically in the range between 2.5 and 3.5 percent by weight. The MgO content is normally in excess of 90 percent by weight. The alumina is a minor quantity usually substantially less than 1 percent by weight. The balance of the usual composition is loss on ignition.

A typical analysis of type II calcined magnesia is as follows:

| | Percent |
|---|---|
| Ignition loss | 0.28 |
| $SiO_2$ | 0.50 |
| $Fe_2O_3$ | 5.19 |
| $Al_2O_3$ | 0.57 |
| CaO | 3.04 |
| MgO (diff.) | 90.42 |

Type II calcined magnesia contains as a substantial mineralogical component dicalcium ferrite which, at high temperatures of service, adversely affects the ability of a refractory brick made from type II calcined magnesia to remain volume stable or to support static load without deformation in spite of the content of more than 90 percent of MgO by weight.

The present invention contemplates making magnesia-containing refractory brick which will have improved strength at high temperatures because the calcined magnesia component itself has improved high temperature strength.

The invention finds its best application in refractories composed of mixtures of type II magnesia with chrome ore.

The principles of the invention may be applied to brick which are kiln-fired or to brick which are installed unfired after drying and curing.

Magnesia brick with added chrome ore in accordance with the invention can be made by mixing the properly screened particles of chrome ore and type II calcined magnesia.

The chrome ore should be low in silica, having a silica content of 4% of $SiO_2$ or less. Transvaal type chrome ore is suitable. A description of Transvaal type chrome ore in considerable detail appears in my U.S. Patent No. 2,656,280, and the reader is referred to this source for general information.

Transvaal type chrome ore has a mol ratio of $Al_2O_3 + Cr_2O_3$ to MgO which exceeds 1.75, and this is an important identifying characteristic of such chrome ore. The mol ratio is determined as described in my U.S. Patent No. 2,656,280, by treatment of the Transvaal chrome ore with sulfuric acid and then with hydrofluoric acid to remove silica or silicates before the chemical analysis is made.

The amount of Transvaal type chrome ore to be mixed with the magnesia is chosen so that the ratio of lime to silica in the mixture shall exceed 1.0 and preferably be about 1.5. In this way the dicalcium ferrite in the magnesia will be converted by reaction with the silicates in the Transvaal type chrome ore (usually silicates of magnesium of low refractoriness) to form magnesium ferrite and mervinite.

This has the effect of diminishing the disadvantages from the presence of monticellite and from the presence of dicalcium ferrite when the refractory mixture is heated during use in the case of unfired brick and during firing in the case of fired brick. The lime changes into mervinite and the iron forms magnesium ferrite and the presence of both of these mineralogical ingredients improves the strength at high temperature as compared with the ingredients formerly present.

If a type II magnesia containing 3.0% CaO and 0.5% $SiO_2$ were mixed 70% by weight with 30% by weight of Transvaal type chrome ore containing 0.5% CaO and 4.0% $SiO_2$, the mixture would contain 2.25% CaO and 1.55% $SiO_2$. The ratio of lime to silica is 1.45, a very desirable figure.

Such a mixture might comprise:

| | Percent |
|---|---|
| Type II magnesite, 4 x 8 | 20 |
| Type II magnesite, 8 x 28 | 35 |
| Type II magnesite, through 48 | 15 |
| Transvaal chrome ore, through 48 | 30 |

For this refractory the type II magnesia should contain less than 0.6% $SiO_2$ and the chrome ore should not exceed approximately 4.0% $SiO_2$ and have say 1 to 4.0% $SiO_2$ by weight. The amount of Transvaal type chrome ore would be between 10% and 35% of the total weight of the refractory mixture. The content of silica in the finished brick would be between 0.8% and 3.0%. The brick has the advantage of high intermediate strength, high load bearing strength at high temperature, and freedom from shrinkage at high temperature. The brick are more resistant to the formation of cracks from 1″ to 3″ behind the hot face due to the low silica content which minimizes the migration of silicates away from the hot face to form a zone which is apt to develop the cracks behind the hot face.

In all of the examples where mesh per linear inch is mentioned it is intended to indicate Tyler standard mesh per linear inch.

The refractory mixtures referred to when used in the unfired state, can be molded to have both external steel plates and internal steel plates in accordance with U.S. Patents Nos. 2,247,376 and 2,791,116. The bricks may also be provided with hanger means according to U.S. Patents Nos. 2,517,876 and 2,781,006 and 2,932,265.

The refractories of the invention have excellent physical properties and give improved service life.

In view of my invention and disclosure, variations and modifications to meet individual whim or particular need will doubtless become evident to others skilled in the art, to obtain all or part of the benefits of my invention without copying the process shown, and I, therefore, claim all such insofar as they fall within the reasonable spirit and scope of my claims.

Having thus described my invention what I claim as new and desire to secure by Letters Patent is:

1. The process of making a refractory which comprises mixing together particles of magnesia having more than 2 percent by weight of ferric oxide, having lime and silica as impurities in a ratio by weight of between two and fourteen and having dicalcium ferrite present as a mineralogical component and between 10 and 35% on the total weight of the refractory mixture of chrome ore having a mol ratio of $Al_2O_3+Cr_2O_3$ to MgO which exceeds about 1.75 and containing silica between 1 and 4%, the ratio of lime to silica in the mixture being in excess of 1.0, and heating the mixture of said magnesia and chrome ore to a temperature of between 1000° and 1700° C., and thereby reacting the components to improve the strength of the refractory at intermediate and high temperatures.

2. The process of claim 1, in which the ratio of lime to silica in the mixture is approximately 1.5.

3. The process of claim 1, in which the magnesia contains less than 0.6% $SiO_2$.

References Cited in the file of this patent

UNITED STATES PATENTS

| 2,571,134 | Hicks et al. | Oct. 16, 1951 |
| 2,775,525 | Austin et al. | Dec. 25, 1956 |